(12) United States Patent
Sato et al.

(10) Patent No.: US 12,304,767 B2
(45) Date of Patent: May 20, 2025

(54) WIRE ROD DISPOSING DEVICE AND WIRE ROD DISPOSITION METHOD

(71) Applicant: NITTOKU Co., Ltd., Saitama (JP)

(72) Inventors: Takayuki Sato, Fukushima (JP); Masashi Watanabe, Fukushima (JP)

(73) Assignee: NITTOKU CO., LTD., Saitama (JP)

( * ) Notice: Subject to any disclaimer, the term of this patent is extended or adjusted under 35 U.S.C. 154(b) by 549 days.

(21) Appl. No.: 17/754,396

(22) PCT Filed: Sep. 8, 2020

(86) PCT No.: PCT/JP2020/034006
§ 371 (c)(1),
(2) Date: Mar. 31, 2022

(87) PCT Pub. No.: WO2021/065383
PCT Pub. Date: Apr. 8, 2021

(65) Prior Publication Data
US 2022/0340392 A1    Oct. 27, 2022

(30) Foreign Application Priority Data

Oct. 2, 2019  (JP) .................................. 2019-181841

(51) Int. Cl.
*B65H 59/38*    (2006.01)

(52) U.S. Cl.
CPC ...... *B65H 59/385* (2013.01); *Y10T 29/49863* (2015.01)

(58) Field of Classification Search
CPC . B65H 59/385; B65H 59/36; Y10T 29/49863; H01F 41/074; H01F 41/084; H01F 41/094; H01F 41/096
See application file for complete search history.

(56) References Cited

U.S. PATENT DOCUMENTS

2010/0230151 A1 *  9/2010  Michalk ........... G06K 19/07779
                                                            29/829
2011/0030202 A1     2/2011  Tani et al.

FOREIGN PATENT DOCUMENTS

DE         1514695 A1    8/1969
JP      2000-128433 A    5/2000

* cited by examiner

Primary Examiner — Lee A Holly
(74) Attorney, Agent, or Firm — Rabin & Berdo, P.C.

(57) ABSTRACT

A wire rod disposing device includes: a wire rod delivering mechanism configured to deliver a wire rod from a nozzle at a predetermined speed; a movable stage serving as a member support part configured to support a base plate serving as a disposition target member such that the wire rod is routed after the wire rod is delivered from the nozzle and curved; and a tension application mechanism configured to apply tension to the wire rod, the wire rod being routed to the base plate by being delivered from the nozzle.

3 Claims, 8 Drawing Sheets

WIRE ROD DISPOSING DEVICE AND WIRE ROD DISPOSITION METHOD

TECHNICAL FIELD

The present invention relates to a wire rod disposing device and a wire rod disposition method.

BACKGROUND ART

Conventionally, as a spiral heating coil of an electromagnetic cooker for heating a bottom of a pot by electromagnetic induction and cooking food in the pot, a coil formed by disposing a wire rod in a spiral shape in a base made of an insulating material (heat-resistant resin) is generally known. A litz wire formed by twisting a plurality of electrical wires is used as the wire rod used for such a heating coil. Because the litz wire is formed by twisting the plurality of electrical wires, the litz wire is known to have a form of a relatively thick wire rod.

In a wire rod disposing device in that disposes such a litz wire in the base serving as a disposition target member, it is required to dispose the litz wire formed by twisting the plurality of electrical wires in the disposition target member while keeping a uniform twisted level, and therefore, it is required to perform the disposition in a state in which the litz wire is tensioned uniformly.

In a normal wire winding device, when the wire rod to which a certain level of tension is applied is to be wound, a tension device applying the tension to the wire rod is provided on the upstream side of the wire winding device, and the wire rod with a predetermined tension is wound in the wire winding device (for example, see JP2000-128433A).

SUMMARY OF INVENTION

However, when the wire rod to which the tension has been applied in advance is guided by a nozzle to the disposition target member, such as a base, as in the normal wire winding device, if the wire rod is of a thick type like the litz wire, the tension of the wire rod is changed between the upstream side and the downstream side of the nozzle due to sliding resistance caused between the wire rod and the nozzle. Thus, there is a problem in that the tension of the wire rod is varied and is not stable after the wire rod has passed the nozzle.

An object of the present invention is to provide a wire rod disposing device capable of stabilizing tension of a wire rod to be disposed through a nozzle and to provide a wire rod disposition method.

According to one aspect of the present invention, a wire rod disposing device includes: a wire rod delivering mechanism configured to deliver a wire rod from a nozzle at a predetermined speed; a member support part configured to support a disposition target member such that the wire rod is routed after the wire rod is delivered from the nozzle and curved; and a tension application mechanism configured to apply tension to the wire rod, the wire rod being routed to the disposition target member by being delivered from the nozzle.

According to another aspect of the present invention, a wire rod disposition method of routing a wire rod to a disposition target member by causing the wire rod to be curved, the wire rod being delivered from a nozzle at a predetermined speed, the method includes: a step of applying tension to the wire rod delivered from the nozzle; and a step of routing the wire rod to the disposition target member, the tension being applied to the wire rod.

DESCRIPTION OF EMBODIMENTS

Next, an embodiment of the present invention will be described in detail with reference to the drawings.

Figure 6:
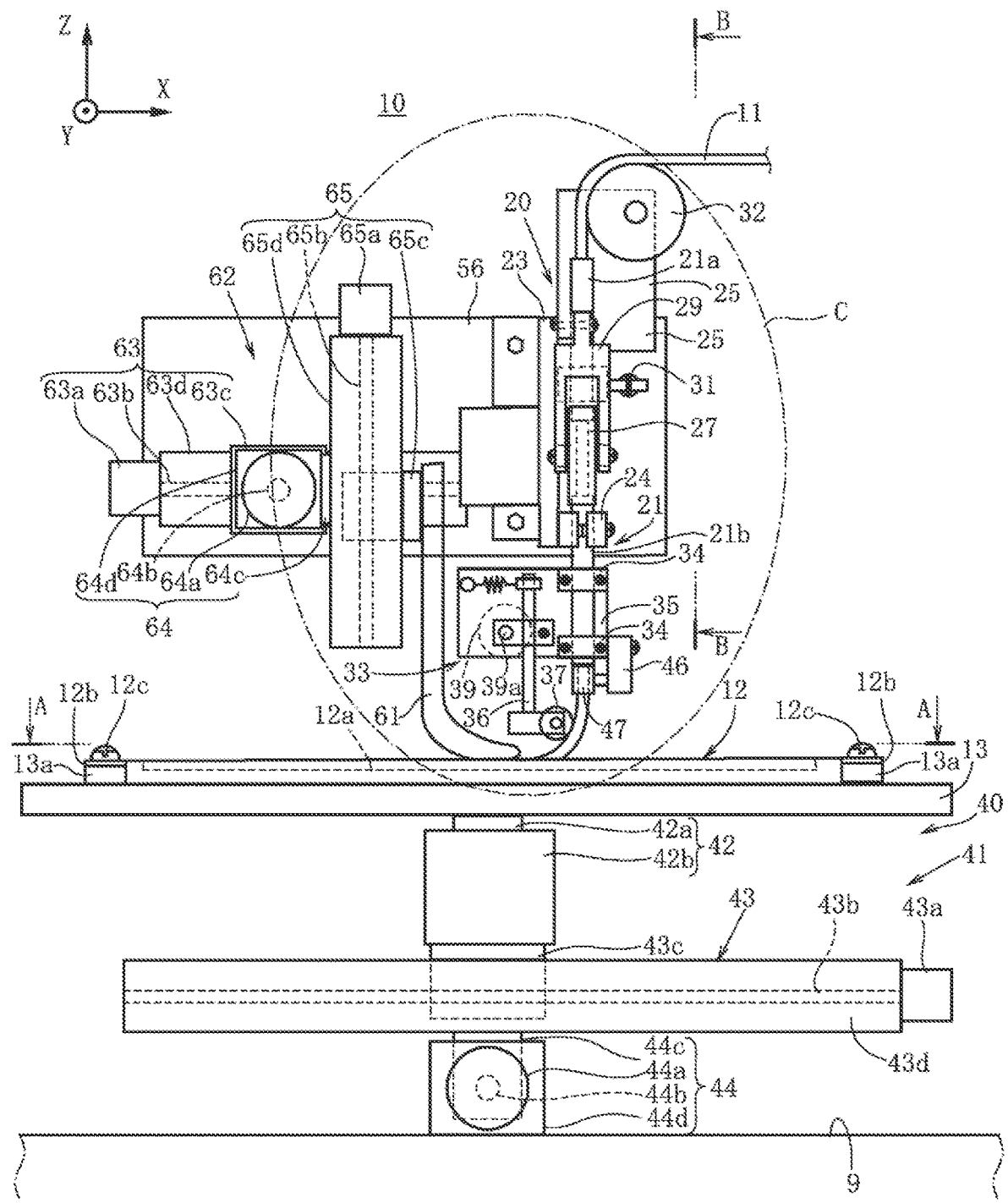
FIG. 6 is a front view showing the wire rod disposing device.
Figure 7:
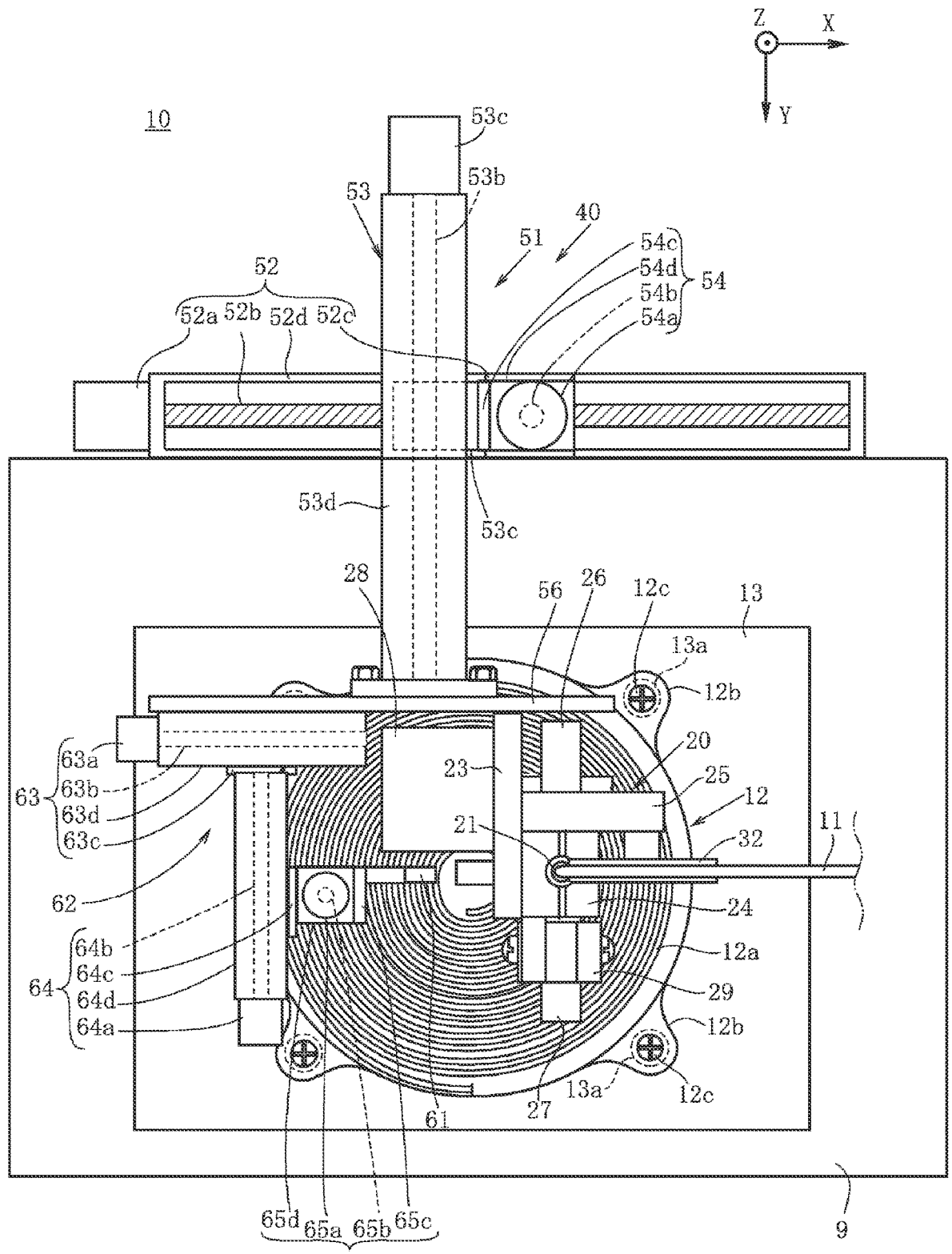
FIG. 7 is a top view showing the wire rod disposing device.

A wire rod disposing device 10 in this embodiment is shown in FIGS. 6 and 7. In the figures, three X, Y, and Z axes that mutually orthogonal are set. The configuration of the wire rod disposing device 10 will be described by stating that the X axis extends in the substantially horizontal transverse direction, the Y axis extends in the substantially horizontal front-rear direction, and the Z axis extends in the vertical direction.

The wire rod disposing device 10 is provided with: a wire rod delivering mechanism 20 that delivers a wire rod 11 from a nozzle 21 at a predetermined speed; a movable stage 13 serving as a member support part that supports a base plate 12 serving as a disposition target member such that the wire rod 11 delivered from the nozzle 21 and curved is routed; relatively moving means 40 that moves the nozzle 21 relative to the base plate 12 at least in the routing direction; and a tension application mechanism 33 that applies the tension to the wire rod 11 that has been delivered from the nozzle 21 and is routed to the base plate 12 (see FIG. 6).

Figure 5:
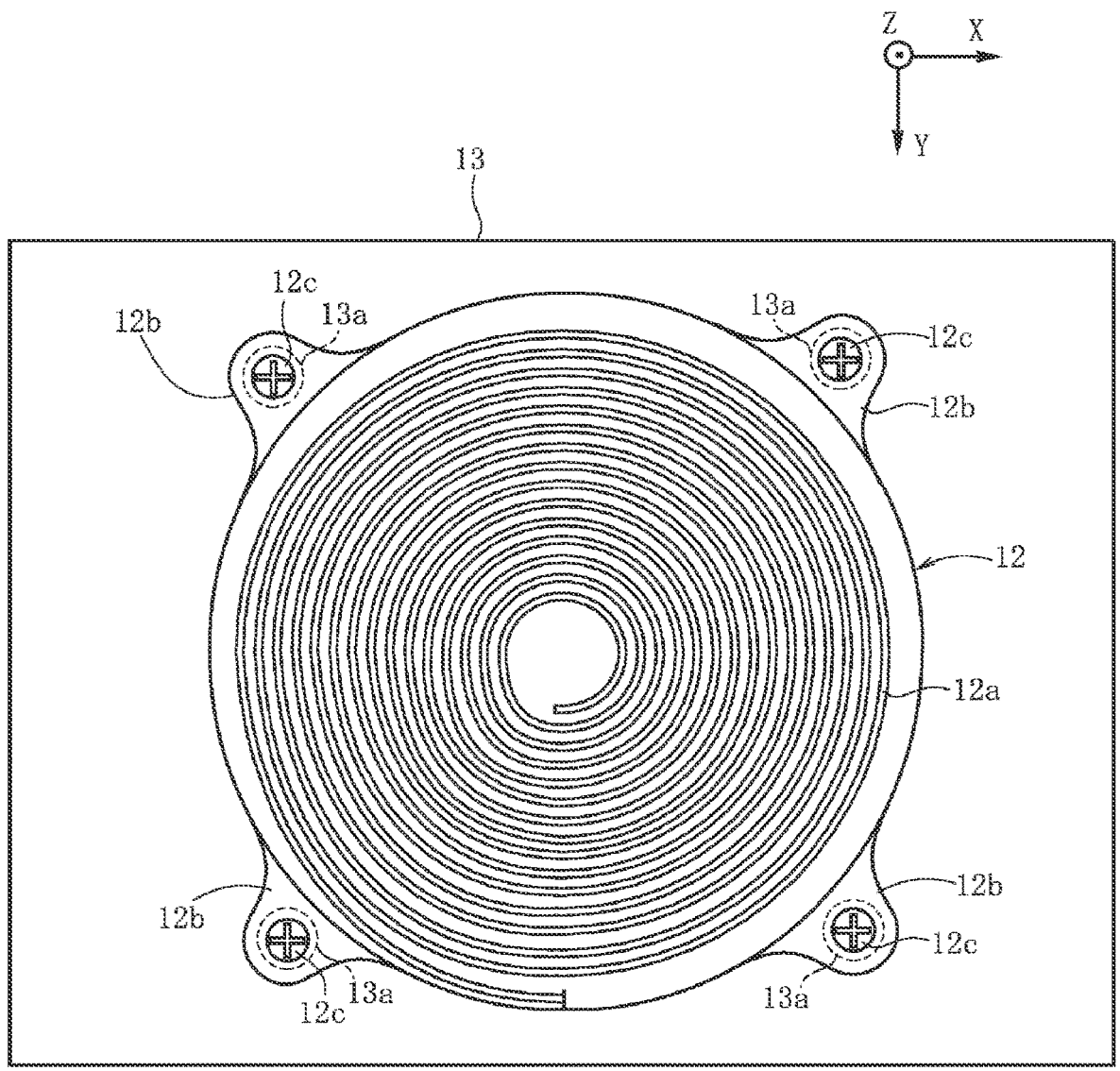
FIG. 5 is a sectional view taken along a line A-A in FIG. 6 showing a disposition target member.

As shown in FIG. 5, the disposition target member in this embodiment is made of an insulating material and is the base plate 12 having a circular plate shape in the surface of which the wire rod 11 delivered from the nozzle 21 (see FIG. 6) is disposed in a spiral shape. A recessed groove 12a in which the wire rod 11 is to be received is formed in the spiral shape on the surface of the disposition target member. Attaching portions 12b for attaching the base plate 12 are formed around the circumference of the base plate 12 having the plate shape so as to project out from the circumference, and the attaching portions 12b are each formed with an attachment hole through which an attachment screw 12c is inserted. Although not shown in the figure, an engaging piece for engaging the wire rod 11 is formed at each of a starting end and a finishing end of the recessed groove 12a formed to have the spiral shape.

The member support part that supports the base plate 12 having the plate shape as described above is the movable stage 13 having a horizontal top surface. As shown in FIGS.

5 and 6, bosses 13a, on which the attaching portions 12b of the base plate 12 are respectively mounted, are provided on the top surface of the movable stage 13 so as to project upwards, and an internal thread hole into which the attachment screw 12c is threaded is formed in each of the bosses 13a. The base plate 12 is configured such that the base plate 12 is supported by respectively threading, in a state in which the attaching portions 12b are respectively mounted on the bosses 13a, the attachment screws 12c inserted into the respective attachment holes to the respective internal threads in the bosses 13a.

The relatively moving means 40 has stage moving means 41 shown in FIG. 6, which moves the movable stage 13 supporting the base plate 12, and device moving means 51 shown in FIG. 7, which moves the nozzle 21 in the three axial directions.

As shown in FIG. 6, the stage moving means 41 in this embodiment has: a rotating motor 42 that rotates the movable stage 13 in a horizontal plane; an X axis direction actuator 43 that moves the rotating motor 42 together with the movable stage 13 in the X axis direction that is the substantially horizontal transverse direction; and a Y axis direction actuator 44 that moves the X axis direction actuator 43 together with the movable stage 13 in the Y axis direction that is the substantially horizontal front-rear direction.

The Y axis direction actuator 44 is provided with a ball screw 44b that is rotationally driven by a servomotor 44a and a follower 44c that is threadably engaged with the ball screw 44b and that moves horizontally, and a housing 44d is attached to a mount base 9 so as to extend in the Y axis direction such that the follower 44c is movable in the Y axis direction.

The X axis direction actuator 43 has the same configuration as the Y axis direction actuator 44, and a housing 43d is attached to the follower 44c of the Y axis direction actuator 44 so as to extend in the X axis direction such that a follower 43c is movable in the X axis direction.

The follower 43c of the X axis direction actuator 43 is provided at a top part of the housing 43d so as to be movable in the X axis direction, and a main body 42b is attached to the follower 43c in a state in which the rotating motor 42 is positioned such that its rotation axis 42a is oriented upwards. The movable stage 13 is attached to an upper end of the rotation axis 42a in a state in which the top surface of the movable stage 13 extends horizontally.

Control outputs from a controller 14 serving as a delivery speed control unit that controls the wire rod disposing device 10 (see FIGS. 1 to 3) are respectively connected to a servomotor 43a in the X axis direction actuator 43, the servomotor 44a in the Y axis direction actuator 44, and the rotating motor 42. In the stage moving means 41 having such a configuration, the movable stage 13 is configured to be rotated in the horizontal plane, and the movable stage 13 is configured so as to be movable in the two axial directions in the horizontal plane.

As shown in FIG. 6, the wire rod delivering mechanism 20 that delivers the wire rod 11 from the nozzle 21 at a predetermined speed is provided above the movable stage 13 such that the nozzle 21 is orthogonal to the surface of the base plate 12. In other words, in this embodiment, the nozzle 21 is provided so as to be oriented in the vertical direction (the Z axis direction).

The wire rod 11 shows a relatively thick rod, and an example thereof is a litz wire formed by twisting a plurality of electrical wires. However, the wire rod 11 is not limited to those formed by twisting a plurality of electrical wires, and the wire rod 11 may be a so-called solid wire having a single core rod as long as it can be disposed to the base plate 12 by being curved.

Figure 4:
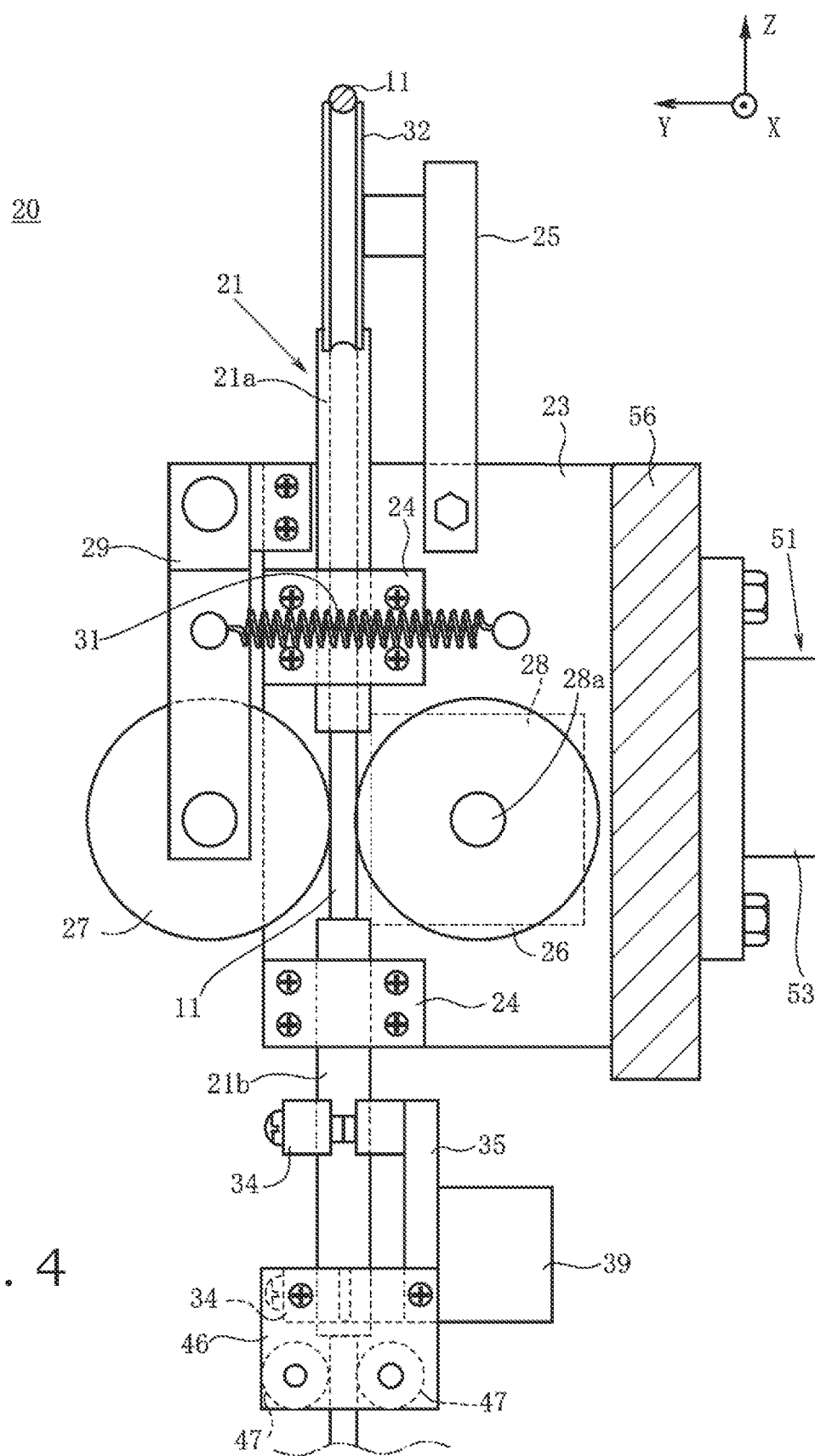
FIG. 4 is a sectional view taken along a line B-B in FIG. 6 showing a wire rod delivering mechanism.

As shown in FIG. 4, in this embodiment, the nozzle 21 in the wire rod delivering mechanism 20 is provided on a mount 23 by being divided, and the nozzle 21 has an upper nozzle piece 21a and a lower nozzle piece 21b that is provided on the extending line of the upper nozzle piece 21a. The upper nozzle piece 21a and the lower nozzle piece 21b are each made from a tubular body having an inner diameter that allows passage of the wire rod 11 and are attached to the mount 23 via an attachment bracket 24 in a coaxial manner.

A gap is formed between the upper nozzle piece 21a and the lower nozzle piece 21b that are provided in a coaxial manner. The wire rod delivering mechanism 20 is provided with a pair of rollers 26 and 27 that clamps the wire rod 11 exposed at the gap, and a delivery motor 28 that rotates one of the rollers, the first roller 26, is provided on the mount 23.

In other words, in this embodiment, the delivery motor 28, in which the first roller 26 is attached to the rotation axis 28a thereof, is attached to the mount 23, and the second roller 27 is attached to the mount 23 via a swing member 29. The swing member 29 is provided so as to extend in parallel with the nozzle 21 in a state in which the swing member 29 is biased towards the nozzle 21. In this state, in the swing member 29, a base end thereof is pivotably supported by the mount 23, and the second roller 27 is pivotably supported by a tip end thereof.

One end of a coil spring 31 is attached to a halfway point of the swing member 29, and the other end of the coil spring 31 is attached to the mount 23 in a state in which the coil spring 31 is stretched towards the first roller 26 side. With such a configuration, the coil spring 31 biases the second roller 27 via the swing member 29 such that the second roller 27 is pressed against the first roller 26. When the wire rod 11 is inserted into the nozzle 21 and the wire rod 11 extends between the upper nozzle piece 21a and the lower nozzle piece 21b, the pair of rollers 26 and 27 are configured so as to clamp the wire rod 11. As the delivery motor 28 is driven and the first roller 26 is rotated at a predetermined speed in this state, the wire rod 11 clamped by the pair of rollers 26 and 27 is delivered from an end portion of the nozzle 21 (i.e., a lower end thereof in this embodiment) at a predetermined speed.

Figure 1:
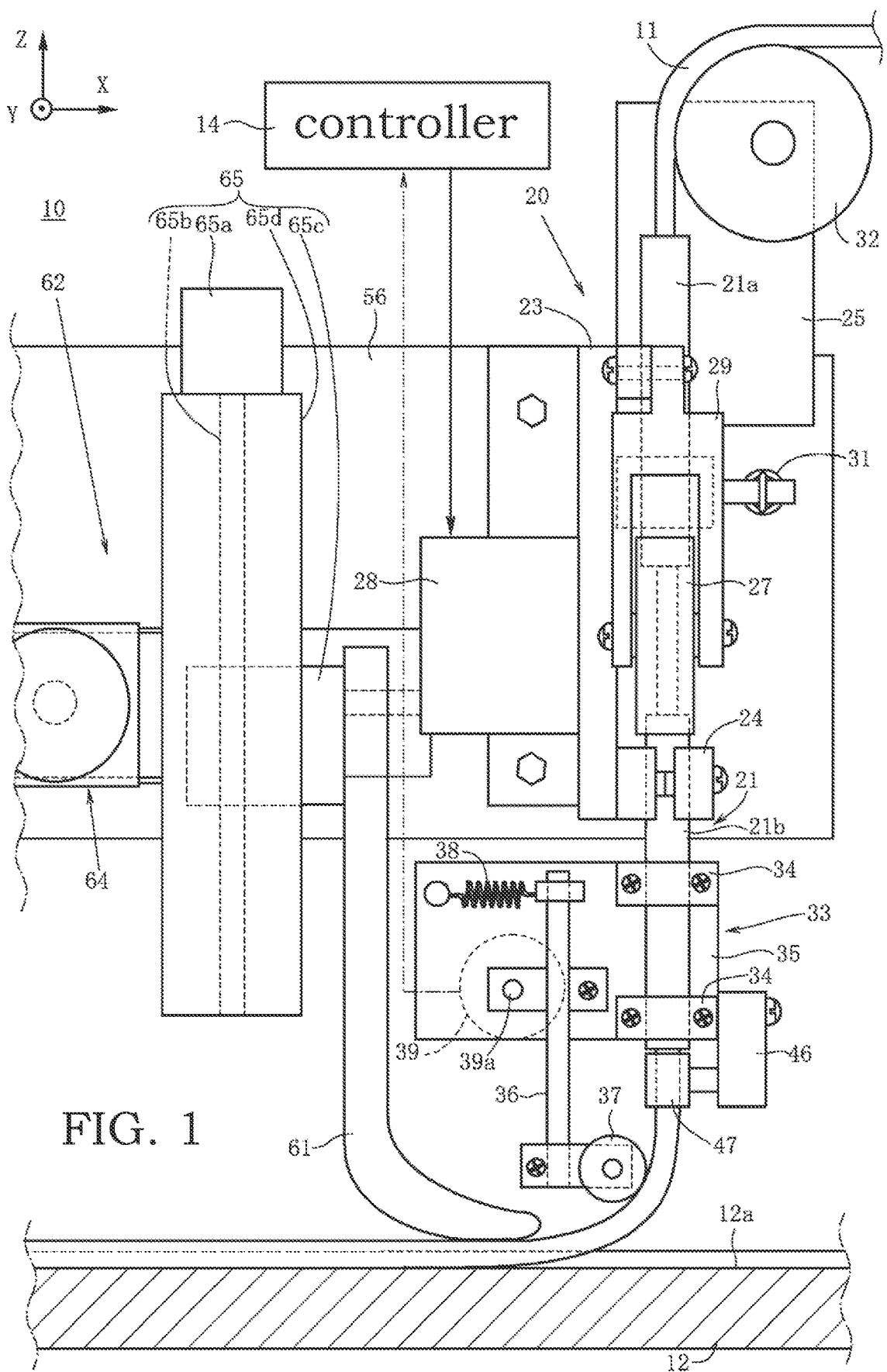
FIG. 1 is an enlarged view of a portion C in FIG. 6 showing a wire rod disposing device in an embodiment of the present invention.
Figure 2:
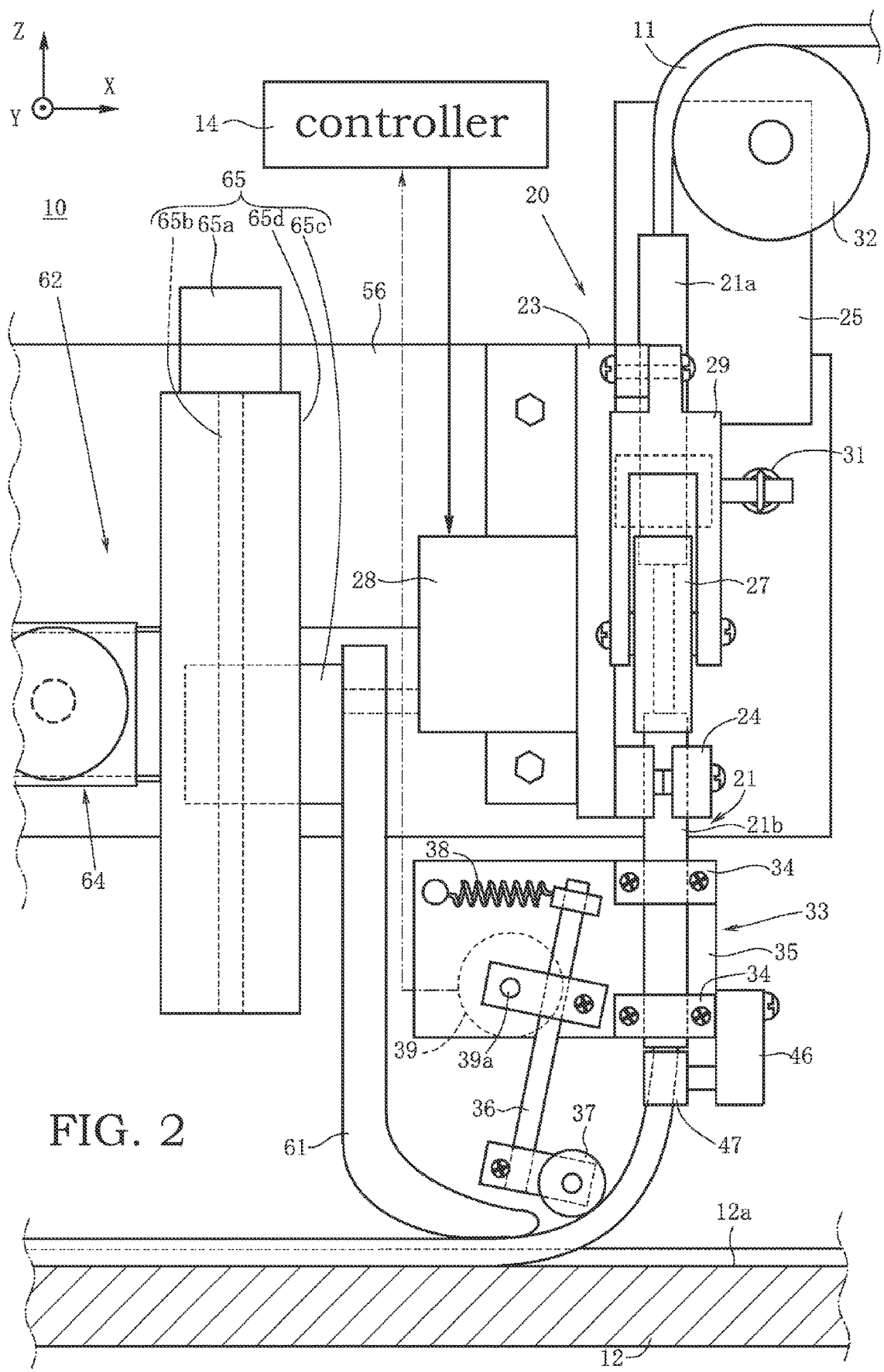
FIG. 2 is a diagram corresponding to FIG. 1 showing a case in which a relatively large tension is applied to a wire rod.
Figure 3:
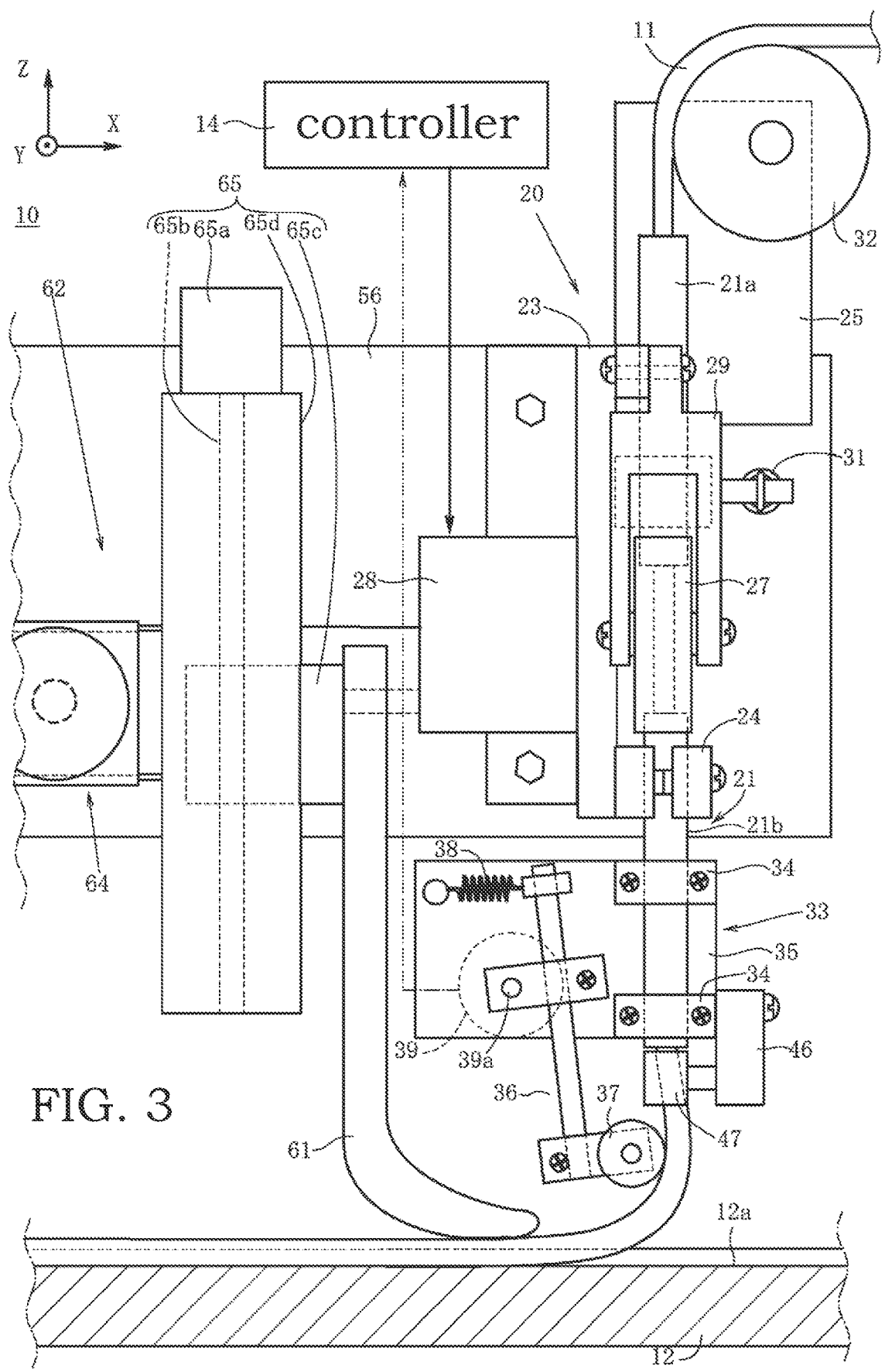
FIG. 3 is a diagram corresponding to FIG. 1 showing a case in which a relatively low tension is applied to the wire rod.

As shown in FIGS. 1 to 3, a pivotably supporting stage 25 is attached to an upper portion of the mount 23, and the pivotably supporting stage 25 pivotably supports a directing roller 32 that directs the wire rod 11 that has been drawn out from a source of the wire rod (not shown) and that guides the wire rod 11 straight to an upper end of the upper nozzle piece 21a. The tension application mechanism 33 that applied the tension to the wire rod 11 delivered from the nozzle 21 is provided on a base panel 35 that is attached to a lower end of the lower nozzle piece 21b via fixtures 34.

Specifically, the tension application mechanism 33 has: a tension bar 36 that is provided on the base panel 35 so as to be pivotable about a pivoting fulcrum at a halfway point; a wire rod guide 37 that is attached to a tip end of the tension bar 36 so as to come into contact with a curvature-inner side (the inner side of the curvature) of the wire rod 11 that has been delivered from the nozzle 21 and curved; a coil spring 38 serving as an elastic member that rotates the tension bar 36 by biasing the tension bar 36 such that the wire rod guide 37 is moved towards a curvature-outer side of the wire rod 11; and a potentiometer 39 serving as a detecting unit that detects a pivot angle of the tension bar 36. In other words, the tension application mechanism 33 has: the tension bar 36 that is pivotable about the pivoting fulcrum; the wire rod guide 37 that is attached to the tension bar 36 and that comes into contact with the curvature-inner side of the curved wire rod 11; and the elastic member that rotates the tension bar 36 by biasing the tension bar 36 such that the wire rod guide 37 is moved towards the curvature-outer side of the wire rod 11. In addition, the wire rod disposing device 10 is further provided with the detecting unit that detects the pivot angle of the tension bar 36.

The detecting unit in this embodiment is the potentiometer 39 that detects the rotated angle of a turning shaft 39a. The potentiometer 39 is attached to the base panel 35, and the halfway point of the tension bar 36 is attached to the turning shaft 39a. The tension bar 36 is provided so as to extend substantially in parallel with the nozzle 21, and the wire rod guide 37 is provided on the tip end of the tension bar 36. In this embodiment, the wire rod guide 37 that is formed from a roller pivotably supported by the tip end of the tension bar 36 is shown.

The elastic member in this embodiment is the coil spring 38. One end of the coil spring 38 is attached to a base end of the tension bar 36, and the other end of the coil spring 38 is attached to the base panel 35 by being stretched so as to bias the base end of the tension bar 36 in the direction away from the nozzle 21.

The coil spring 38 that is attached by being stretched as described above is configured such that the wire rod guide 37 is pressed against the wire rod 11 by its contractive elastic force, the tension bar 36 is rotated by being biased such that the wire rod guide 37 is moved towards the curvature-outer side of the wire rod 11, and thereby, a predetermined tension is applied to the wire rod 11 that is moving towards the base plate 12 after being delivered from the nozzle 21.

Thus, a level of the tension applied by the coil spring 38 to the wire rod 11 can be expressed as the rotated angle of the tension bar 36, and the rotated angle is detected by the potentiometer 39 as the level of the tension applied to the wire rod 11. The wire rod disposing device 10 is provided with the controller 14 serving as the delivery speed control unit that is capable of controlling the wire rod delivering mechanism 20 such that the rotated angle detected by the potentiometer 39 becomes a predetermined value. In other words, the wire rod disposing device 10 is further provided with the delivery speed control unit that controls a delivery speed of the wire rod 11 by the wire rod delivering mechanism 20 such that the pivot angle detected by the detecting unit becomes a predetermined angle.

The delivery speed control unit in this embodiment is the controller 14 that controls the wire rod disposing device 10 as a whole. A detection output from the potentiometer 39 in the tension application mechanism 33 is connected to the control input of the controller 14, and the control output from the controller 14 is connected to the delivery motor 28 in the wire rod delivering mechanism 20. The controller 14 is configured so as to control the delivery motor 28 such that the rotated angle of the tension bar 36 detected by the potentiometer 39 becomes a predetermined value, in other words, such that the angle of the tension bar 36 remains constant without being changed.

As shown in FIGS. 1 to 4, the base panel 35 is attached with an intersecting plate 46 so as to intersect with the base panel 35, and a pair of rollers 47 and 47 that clamp, in the width direction, the wire rod 11 that has been delivered from the nozzle 21 and curved are pivotably supported by the intersecting plate 46. The pair of rollers 47 and 47 are configured to prevent the wire rod 11, which has been delivered from the nozzle 21, from moving towards the width direction and to cause the wire rod 11 to be curved in the routing direction in the base plate 12 with an accuracy.

As shown in FIG. 7, the device moving means 51 that moves, together with the tension application mechanism 33 as described above, the wire rod delivering mechanism 20 including the nozzle 21 in the three axial directions is configured by combining X, Y, and Z-axis direction extension/contraction actuators 52 to 54. The extension/contraction actuators 52 to 54 respectively have ball screws 52b to 54b that are rotationally driven by servomotors 52a to 54a and followers 52c to 54c that are threadably engaged with the ball screws 52b to 54b and that are moved horizontally.

In the Z-axis direction extension/contraction actuator 54, a housing 54d is attached to the follower 52c of the X-axis direction extension/contraction actuator 52 such that the follower 54c is movable in the vertical direction. In the X-axis direction extension/contraction actuator 52, a housing 52d is attached to a side surface of the mount base 9 such that the follower 52c is movable in the X axis direction together with the Z-axis direction extension/contraction actuator 54. The follower 53c of the Y-axis direction extension/contraction actuator 53 is attached to the follower 54c of the Z-axis direction extension/contraction actuator 54, and an attachment plate 56 is attached to an end portion of a housing 53d extending in the Y axis direction of the Y-axis direction extension/contraction actuator 53. The mount 23 in the wire rod delivering mechanism 20 including the nozzle 21 is screwed to the attachment plate 56.

The control outputs from the controller 14 that controls the wire rod disposing device 10 (see FIGS. 1 to 3) are respectively connected to the servomotors 52a to 54a in the extension/contraction actuators 52 to 54. The device moving means 51 having such a configuration is configured to move the nozzle 21 in the wire rod delivering mechanism 20 in the three axial directions in accordance with instructions from the controller 14. The device moving means 51 also configures, together with the stage moving means 41, the relatively moving means 40 that moves the nozzle 21 relative to the base plate 12.

As shown in FIGS. 6 and 7, the wire rod disposing device 10 is further provided with a pushing member 61 that pushes the wire rod 11 against the base plate 12 after the wire rod 11 has been delivered from the nozzle 21 and curved. The pushing member 61 is attached to the attachment plate 56, to which the nozzle 21 is attached, via a member moving means 62 that moves the pushing member 61 in the three axial directions.

The member moving means 62 also has the same configuration as the device moving means 51 and is configured by combining X-axis, Y-axis, and Z-axis direction extension/contraction actuators 63 to 65. In the Z-axis direction extension/contraction actuator 65, a housing 65d is attached to a follower 64c of the Y-axis direction extension/contraction actuator 64 such that a follower 65c is movable in the vertical direction. In the Y-axis direction extension/contraction actuator 64, a housing 64d is attached to a follower 63c of the X-axis direction extension/contraction actuator 63 such that the follower 64c is movable in the Y axis direction. In the X-axis direction extension/contraction actuator 63, a housing 63d is attached to the attachment plate 56 by extending in the X axis direction such that the follower 63c is movable in the X axis direction.

The pushing member 61 is attached to the follower 65c of the Z-axis direction extension/contraction actuator 65 by extending in the vertical direction. In this configuration, the pushing member 61 is a spatula having a shape that a lower end thereof is curved towards the nozzle 21 side, and the wire rod 11 delivered from the nozzle 21 is pushed into the recessed groove 12a formed in the surface of the base plate 12 as the wire rod 11 is pressed against a round portion at the lower end.

Next, a wire rod disposition method in this embodiment using the wire rod disposing device having the configuration as described above will be described.

The wire rod disposition method in this embodiment is a method of routing the wire rod 11 that has been delivered from the nozzle 21 at a predetermined speed into the base plate 12 serving as the disposition target member by causing the wire rod 11 to be curved, and is characterized in that the tension is applied to the wire rod 11 that has been delivered from the nozzle 21, and in that the wire rod 11, which has been delivered from the nozzle 21 and to which the tension has been applied, is routed to the base plate 12.

Because the above-described wire rod disposing device 10 is used, the base plate 12 is supported on the movable stage 13 serving as the member support part. In this embodiment in which the base plate 12 is used as the disposition target member, as shown in FIG. 5, in a state in which the attaching portions 12b are respectively placed on the bosses 13a on the movable stage 13 that is the member support part, the attachment screws 12c respectively inserted into the attachment holes in the attaching portions 12b are threaded to the internal threads in the bosses 13a. By doing so, the base plate 12 is caused to be supported by the movable stage 13.

The wire rod 11 to be disposed on the base plate 12 is prepared in a state in which the wire rod 11 is wound around a cable reel (not shown), for example. Because the above-described wire rod disposing device 10 is used, the wire rod 11 is drawn out from the cable reel that is the source of the wire rod, and as shown in FIGS. 1 to 4, the wire rod 11 is then directed by the directing roller 32, and the thus-directed wire rod 11 is inserted into the nozzle 21.

As shown in FIG. 4, the wire rod 11 that is inserted into the nozzle 21 is clamped by the pair of rollers 26 and 27 between the upper nozzle piece 21a and the lower nozzle piece 21b. At this state, the delivery motor 28 is driven to rotate the pair of rollers 26 and 27 to deliver the wire rod 11 from the nozzle 21. In a state in which a predetermined amount of wire rod 11 is delivered from the nozzle 21, the rotation of the first roller 26 by the delivery motor 28 is stopped to stop the delivery of the wire rod 11 from the end portion of the nozzle 21.

From this state, the wire rod 11 is disposed to the base plate 12. In order to do so, the relatively moving means 40 moves the nozzle 21 to a disposition start position for the wire rod 11 relative to the base plate 12, and the end portion of the wire rod 11 delivered from the nozzle 21 is engaged with the engaging piece (not shown) in the disposition start position of the base plate 12.

Thereafter, in a state in which the end portion of the nozzle 21 faces the recessed groove 12a that is formed in the surface of the base plate 12 having a flat plate shape, the nozzle 21 is moved in the routing direction while delivering the wire rod 11. By doing so, as shown in FIG. 1, the wire rod 11 delivered from the nozzle 21 is routed on the base plate 12.

The movement of the nozzle 21 relative to the base plate 12 is achieved by the relatively moving means 40 (see FIGS. 6 and 7). The delivery of the wire rod 11 from the nozzle 21 at a predetermined speed is performed by driving the delivery motor 28 to rotate the first roller 26, and by sequentially delivering the wire rod 11 that is clamped by the pair of rollers 26 and 27 from the end portion of the nozzle 21 via the nozzle 21.

As shown in FIG. 1, in the above-described wire rod disposing device 10, the wire rod delivering mechanism 20 including the nozzle 21 is provided above the base plate 12, and the nozzle 21 is attached in the vertical direction so as to be orthogonal to the surface of the base plate 12. Therefore, the wire rod 11 that has been delivered from the nozzle 21 downward in the vertical direction is curved, and the wire rod 11 is routed to the base plate 12 after being directed to the horizontal direction so as to follow a top surface of the base plate 12.

In the wire rod disposition method in this embodiment, the tension is applied to the wire rod 11 delivered from the nozzle 21. The above-described wire rod disposing device 10 is provided with the tension application mechanism 33 that applies the tension to the wire rod 11 delivered from the nozzle 21. The application of the tension to the wire rod 11 by the tension application mechanism 33 is performed by biasing the wire rod guide 37 in contact with the curvature-inner side of the wire rod 11 by the coil spring 38 serving as the elastic member towards the curvature-outer side of the wire rod 11. In other words, the application of the tension to the wire rod 11 is performed by biasing the wire rod guide 37 that is brought into contact with the curvature-inner side of the wire rod 11, which has been delivered from the nozzle 21 and curved, towards the curvature-outer side of the wire rod 11.

As described above, because the tension is applied to the wire rod 11 to be routed to the base plate 12 by being delivered from the nozzle 21, a sliding resistance caused between the wire rod 11 and the nozzle 21 has no influence to the tension to be applied to the wire rod 11 after it has passed through the nozzle 21. Thus, in this embodiment, by applying the tension after the wire rod 11 has passed through the nozzle 21, it is possible to stabilize the tension of the wire rod 11 to be disposed to the base plate 12.

In addition, the tension is applied to the wire rod 11 that has been delivered from the nozzle 21 by biasing the wire rod guide 37 towards the curvature-outer side of the wire rod 11. Thus, as shown in FIG. 2, when a relatively high tension is applied to the wire rod 11, the coil spring 38 that is the elastic member is stretched, and the wire rod 11 that has been delivered from the nozzle 21 is directed to the routing direction readily.

On the other hand, as shown in FIG. 3, when the tension applied to the wire rod 11 is relatively low, the coil spring 38, which is the elastic member, is not stretched, and the wire rod 11 that has been delivered from the nozzle 21 is not directed to the routing direction readily.

Therefore, depending on the position of the wire rod guide 37 biased by the coil spring 38, the tension to be applied to the wire rod 11 is changed, and an extent to which the coil spring 38, which is the elastic member, is stretched is changed depending on the rotated angle of the tension bar 36 on the tip end of which the wire rod guide 37 is provided. Thus, if the rotated angle of the tension bar 36 is kept constant, the tension applied to the wire rod 11 that has been delivered from the nozzle 21 is also kept constant without being changed.

Because the wire rod 11 in this embodiment is a relatively thick litz wire, if such a relatively thick wire rod 11 is to be disposed to the base plate 12, it is required to dispose the wire rod 11 formed by twisting the plurality of electrical wires to the base plate 12 while keeping a uniform twisted level. Therefore, the wire rod 11 needs to be disposed while keeping the tension applied to the wire rod 11 constant.

In the above-described wire rod disposing device 10, the rotated angle of the tension bar 36, on the tip end of which the wire rod guide 37 actually applying the tension to the wire rod 11 is provided, is detected by the potentiometer 39. Thus, by controlling the delivery speed of the wire rod 11 from the nozzle 21 such that the pivot angle of the tension bar 36 becomes a predetermined angle, it is possible to perform the disposing operation of the wire rod 11 in a state in which the tension applied to the wire rod 11 is always kept constant.

In other words, for example, as shown in FIG. 2, by controlling the delivery speed of the wire rod 11 from the nozzle 21 such that the coil spring 38, which is the elastic member, is stretched and the pivot angle of the tension bar 36 at which a relatively high tension is applied to the wire rod 11 is maintained, it is possible to perform the disposing operation of the wire rod 11 in a state in which a relatively high tension is applied to the wire rod 11.

On the other hand, as shown in FIG. 3, by controlling the delivery speed of the wire rod 11 from the nozzle 21 such that the coil spring 38, which is the elastic member, is less stretched and the pivot angle of the tension bar 36 at which a relatively low tension is applied to the wire rod 11 is maintained, it is possible to perform the disposing operation of the wire rod 11 in a state in which a relatively low tension is applied to the wire rod 11.

As shown in FIG. 5, because the base plate 12 in this embodiment is formed to have, on the surface of which, the recessed groove 12a having the spiral shape into which the wire rod 11 is received, the nozzle 21 is moved in the longitudinal direction of the recessed groove 12a that is the routing direction. As shown in FIGS. 1 to 3, the wire rod 11 that has been delivered from the nozzle 21 and to which a predetermined tension has been applied is disposed by being sequentially received in the recessed groove 12a after being directed to the horizontal direction so as to follow the top surface of the base plate 12.

Because the above-described wire rod disposing device 10 is provided with the pushing member 61 that pushes the wire rod 11 against the base plate 12 after the wire rod 11 has been delivered from the nozzle 21, after the wire rod 11 has been delivered from the nozzle 21 and a predetermined tension has been applied to the wire rod 11, the wire rod 11 is pushed into the recessed groove 12a by the pushing member 61 in a state in which the wire rod 11 is directed to the horizontal direction. By pressing the wire rod guide 37 against the wire rod 11, it is possible to prevent the wire rod 11 from being pulled out from the recessed groove 12a due to the tension applied to the wire rod 11.

In the above-described embodiment, a description has been given of a case in which the nozzle 21 provided above the base plate 12 is oriented in the vertical direction so as to be orthogonal to the surface of the base plate 12 that is attached horizontally. As described above, subsequent to the delivery from the nozzle 21, the wire rod 11 is disposed along the top surface of the base plate 12 after the wire rod 11 is directed substantially perpendicularly with respect to the delivered direction after being curved.

Figure 8:
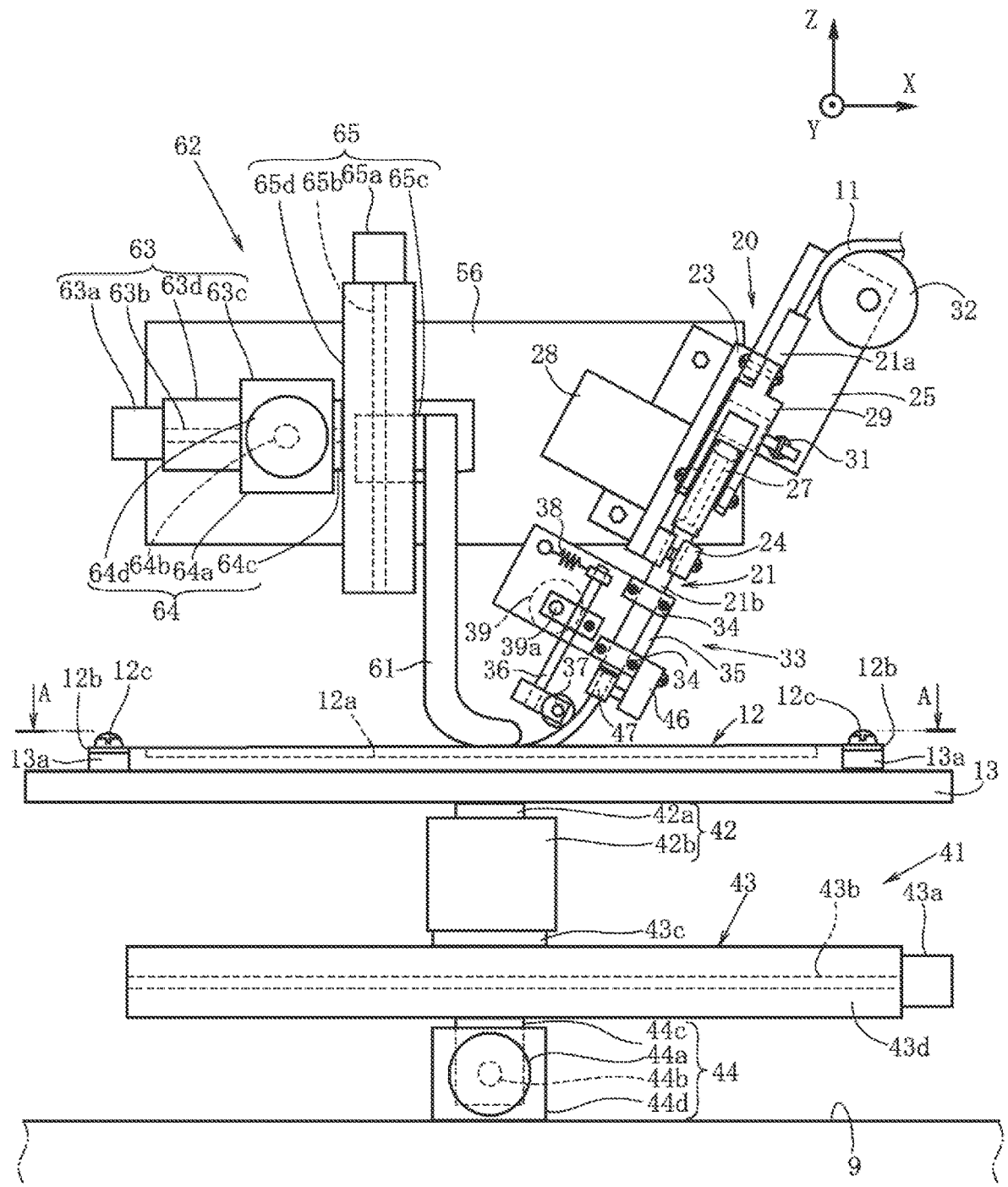
FIG. 8 is a front view showing another wire rod disposing device.

However, in a case in which the wire rod 11 is relatively thick and is hard to be curved, as shown in FIG. 8, the nozzle 21 provided above the base plate 12 may be attached so as to be inclined with respect to the surface of the base plate 12.

In the wire rod disposing device 10 in which the nozzle 21 is attached so as to be inclined as described above, subsequent to the delivery from the nozzle 21, the wire rod 11 is curved first, and thereafter, it is disposed along the top surface of the base plate 12 after being directed to the angle corresponding to the inclined angle of the nozzle 21 with respect to the delivery direction. Then, because the directed angle becomes smaller than the right angle, even if the wire rod 11 is relatively thick and hard to be curved, it is possible to dispose the wire rod 11 to the base plate 12 with ease.

Even if the nozzle 21 is inclined as described above, by applying a predetermined tension to the wire rod 11 after it has been delivered from the nozzle 21, it is possible to stabilize the tension of the wire rod 11 that is to be disposed to the base plate 12 through the nozzle 21.

In addition, the wire rod guide 37 may be provided on the tension bar 36 that is pivotable about the pivoting fulcrum, and the delivery speed of the wire rod 11 from the nozzle 21 may be controlled such that the pivot angle of the tension bar 36 becomes a predetermined angle. Because the wire rod guide 37 that applies the tension to the wire rod 11 is provided on the tension bar 36 that is pivotable about the pivoting fulcrum, by controlling the delivery speed of the wire rod 11 from the nozzle 21 such that the pivot angle of the tension bar 36 becomes a predetermined angle, it is possible to dispose the wire rod 11 to the base plate 12 under a desired tension, even if the wire rod 11 is relatively thick and hard to be curved.

In addition, in the above-described embodiment, although a description has been given of the wire rod disposing device 10 provided with the pushing member 61 that pushes the wire rod 11 against the base plate 12 after the wire rod 11 has been delivered from the nozzle 21 and curved, the pushing member 61 is not necessarily employed as long as the wire rod 11 can be disposed to the base plate 12.

In addition, in the above-described embodiment, a description has been given of a case in which the base plate 12 is used for an electromagnetic cooker and is a base plate having the circular plate shape on the surface of which the recessed groove 12a is formed so as to have the spiral shape. However, as long as the wire rod 11 can be disposed, the base plate 12 is not limited to those used for the electromagnetic cooker or those having the circular plate shape. A disposing shape is not limited to the spiral shape, and the base plate 12 may be configured such that the wire rod 11 is disposed to form an oval shape or an elliptical shape, for example. The base plate 12 may not be formed with the recessed groove 12a on the surface thereof.

In addition, in the above-described embodiment, a description has been given of a case in which the base plate 12 is supported by the movable stage 13 that is the member support part by using the attachment screws 12c. However, the base plate 12 may be supported by the member support part by other means without using the attachment screws 12c.

Furthermore, in the above-described embodiment, a description has been given of a case in which the wire rod guide 37 is a roller, and the pushing member 61 is formed as the spatula the lower end of which is curved towards the nozzle side. However, this is only an example, and the wire rod guide 37 may have the spatula shape that is brought into sliding contact with the wire rod 11, and the pushing member 61 may be a roller that is rotated by the wire rod 11 moving around the outer circumference thereof.

Embodiments of the present invention were described above, but the above embodiments are merely examples of applications of the present invention, and the technical scope of the present invention is not limited to the specific constitutions of the above embodiments.

With respect to the above description, the contents of application No. 2019-181841, with a filing date of Oct. 2, 2019 in Japan, are incorporated herein by reference.

The invention claimed is:

1. A wire rod disposing device, comprising:
   a wire rod delivering mechanism configured to deliver a wire rod from a nozzle at a predetermined speed;
   a member support part configured to support a disposition target member such that the wire rod is routed after the wire rod is delivered from the nozzle and curved; and
   a tension application mechanism configured to apply tension to the wire rod, the wire rod being routed to the disposition target member by being delivered from the nozzle, wherein
   the tension application mechanism has:
      a wire rod guide in contact with a curvature-inner side of the wire rod that has been delivered from the nozzle and curved; and
      an elastic member configured to bias the wire rod guide such that the wire rod guide is moved towards a curvature-outer side of the wire rod; and
      a tension bar pivotable about a pinned support,
   the wire rod guide is attached to the tension bar, and
   the elastic member is configured to bias and rotate the tension bar such that the wire rod guide is to be moved towards the curvature-outer side of the wire rod.

2. The wire rod disposing device according to claim 1, further comprising:
   a detecting unit configured to detect a pivot angle of the tension bar; and
   a delivery speed control unit configured to control a delivery speed of the wire rod by the wire rod delivering mechanism such that the pivot angle detected by the detecting unit is to be a predetermined angle.

3. The wire rod disposing device according to claim 1, further comprising
   a pushing member configured to push the wire rod to the disposition target member after the wire rod is delivered from the nozzle and curved.

* * * * *